United States Patent
Arganbright et al.

(10) Patent No.: US 12,513,057 B2
(45) Date of Patent: Dec. 30, 2025

(54) USER INTERFACE DISPLAY TECHNIQUES FOR TRAFFIC SLICING ACROSS HETEROGENEOUS LINKS

(71) Applicant: Rockwell Collins, Inc., Cedar Rapids, IA (US)

(72) Inventors: Timothy J. Arganbright, Cedar Rapids, IA (US); Robert J. Mourlam, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 8 days.

(21) Appl. No.: 18/437,622

(22) Filed: Feb. 9, 2024

(65) Prior Publication Data
US 2025/0260632 A1    Aug. 14, 2025

(51) Int. Cl.
H04L 41/22    (2022.01)
H04L 41/12    (2022.01)
H04L 43/045   (2022.01)

(52) U.S. Cl.
CPC .............. *H04L 41/22* (2013.01); *H04L 41/12* (2013.01); *H04L 43/045* (2013.01)

(58) Field of Classification Search
CPC ........ H04L 43/045; H04L 41/12; H04L 41/22
See application file for complete search history.

(56) References Cited

U.S. PATENT DOCUMENTS

| | | | |
|---|---|---|---|
| 9,001,668 B2 | 4/2015 | Gintis et al. | |
| 9,286,620 B2 | 3/2016 | Matthews et al. | |
| 9,985,858 B2 | 5/2018 | Lad et al. | |
| 11,252,059 B2 | 2/2022 | Bauan et al. | |
| 11,522,770 B2 | 12/2022 | Khetarpal et al. | |
| 2005/0060574 A1 | 3/2005 | Klotz et al. | |
| 2021/0029059 A1* | 1/2021 | Nhu | H04L 49/20 |
| 2022/0014451 A1* | 1/2022 | Naik | H04L 45/02 |
| 2022/0200894 A1 | 6/2022 | Carnes et al. | |
| 2023/0275814 A1* | 8/2023 | Gupta | G06F 3/04847 715/735 |
| 2023/0403214 A1 | 12/2023 | Cherkas | |
| 2024/0380686 A1* | 11/2024 | Meo | H04L 45/16 |

FOREIGN PATENT DOCUMENTS

| | | |
|---|---|---|
| EP | 1457009 A4 | 9/2004 |
| EP | 3178201 B1 | 3/2019 |

* cited by examiner

*Primary Examiner* — Tonia L Dollinger
*Assistant Examiner* — Joseph M Cousins
(74) *Attorney, Agent, or Firm* — Suiter Swantz IP

(57) ABSTRACT

A traffic slicing visualization system receives user selections for specific path types to visualize, then retrieves metrics for each potential path. The potential paths are characterized according to the metrics and assigned a visualization corresponding to path type. The potential paths are then rendered according to the assigned visualization. The slicing visualization system may dynamically receive and re-render updated selections. Furthermore, the slicing visualization system may identify a current application and determine a desirable path type according to the current application.

9 Claims, 4 Drawing Sheets

USER INTERFACE DISPLAY TECHNIQUES FOR TRAFFIC SLICING ACROSS HETEROGENEOUS LINKS

GOVERNMENT LICENSE RIGHTS

The U.S. Government has a paid-up license in this invention and the right in limited circumstances to require the patent owner to license others on reasonable terms as provided by the terms of FA875020C0242 awarded by Defense Advanced Research Project Agency (DARPA).

BACKGROUND

Display tools offer the ability to show routes through a network by illustrating next hop nodes for traffic paths through a network. Usage of heterogeneous data links for slicing traffic across those tactical networks adds another level of complexity to network operators and analyzers. Enhancements have been made in some cases to show each heterogeneous link.

SUMMARY

In one aspect, embodiments of the inventive concepts disclosed herein are directed to a traffic slicing visualization system. The system receives user selections for specific path types to visualize, then retrieves metrics for each potential path. The potential paths are characterized according to the metrics and assigned a visualization corresponding to path type. The potential paths are then rendered according to the assigned visualization.

In a further aspect, the slicing visualization system may dynamically receive and re-render updated selections.

In a further aspect, the slicing visualization system may identify a current application and determine a desirable path type according to the current application.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
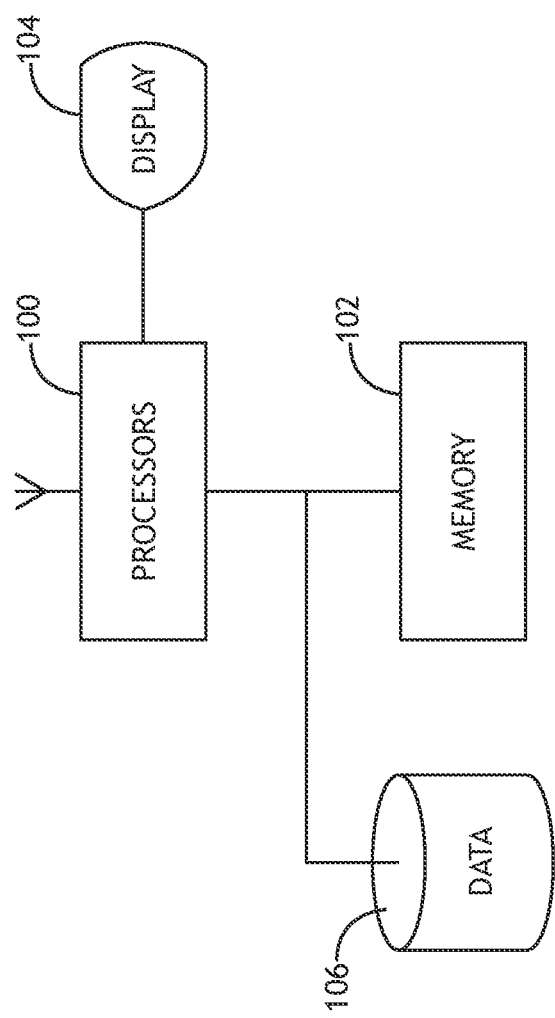
FIG. 1 shows a block diagram of a system suitable for implementing embodiments of the present disclosure.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed a traffic slicing visualization system. The system receives user selections for specific path types to visualize, then retrieves metrics for each potential path. The potential paths are characterized according to the metrics and assigned a visualization corresponding to path type. The potential paths are then rendered according to the assigned visualization. The slicing visualization system may dynamically receive and re-render updated selections. Furthermore, the slicing visualization system may identify a current application and determine a desirable path type according to the current application.

Referring to FIG. 1, a block diagram of a system suitable for implementing embodiments of the present disclosure is shown. The system includes a processor 100, memory 102 connected to the processor 100 for embodying processor executable code, and a display 104 connected to the processor 100. In at least one embodiment, the processor 100 may be in data communication with one or more external systems configured to provide network datalink metrics to the processor 100. Alternatively, or in addition, the system may include a data storage element 106 connected to the processor 100.

In at least one embodiment, the processor 100 receives a selection corresponding to one or more network traffic slices. In the context of the present application, a traffic slice is a path between nodes in a network that satisfies predefined requirements for successfully delivering traffic across the network. Predefined requirements may be characterized by sets of datalink metrics such as reliability, latency, bandwidth, etc. Furthermore, slices may be defined by certain threshold requirements; for example, a "Low Latency" slice may be defined by a threshold latency, a "High Reliability" slice may be defined by a threshold reliability, and a "High Throughput" slice may be defined by a threshold throughput. Each slice may be defined a single requirement or some set of requirements; for example, a High Reliability slice may require both a threshold reliability and some minimum throughput.

In at least one embodiment, a user (network operator) may select one or more slices to visualize via a list of available slices. Upon selection, the processor 100 determines which paths satisfy the datalink metrics defined by the slice, and render only those paths on the display 104. In at least one embodiment, the processor 100 may select one or more default slices to render based on the requirements of a given application or mission goal.

In at least one embodiment, the processor 100 may select or apply a predefined indicator to paths in a given slice. Such indicators may be distinct; for example, paths in a High Reliability slice may be rendered in a first color while paths in a Low Latency slice may be rendered in a second color. In at least one embodiment, paths may satisfy the metrics of more than one slice. Where a path exists in more than one slice, the processor 100 may render the path in a way to indicate the multi-slice nature of the path. For example, the path may be rendered in alternating colors corresponding to slices; the path may be rendered with multiple, parallel lines in the colors corresponding to the slices; or the path may be rendered with alternating colors over time. Alternatively, slices may define a hierarchy wherein a user may select which slice is most important for multi-slice paths. Such multi-path rendering methodology may be user selectable.

In at least one embodiment, each path may be accompanied by a label indicating the corresponding slice. For example, the processor 100 may render "LL" proximate to paths in a Low Latency slice; and render "HT" proximate to paths in a High Throughput slice.

In at least one embodiment, the processor 100 may receive a user selection of an initial node and an end node. The processor 100 may then render only the paths that enable traffic between those nodes, in the selected slices.

In at least one embodiment, the processor 100 may continuously receive datalink metrics, and update rendered paths in real-time.

Figure 2:
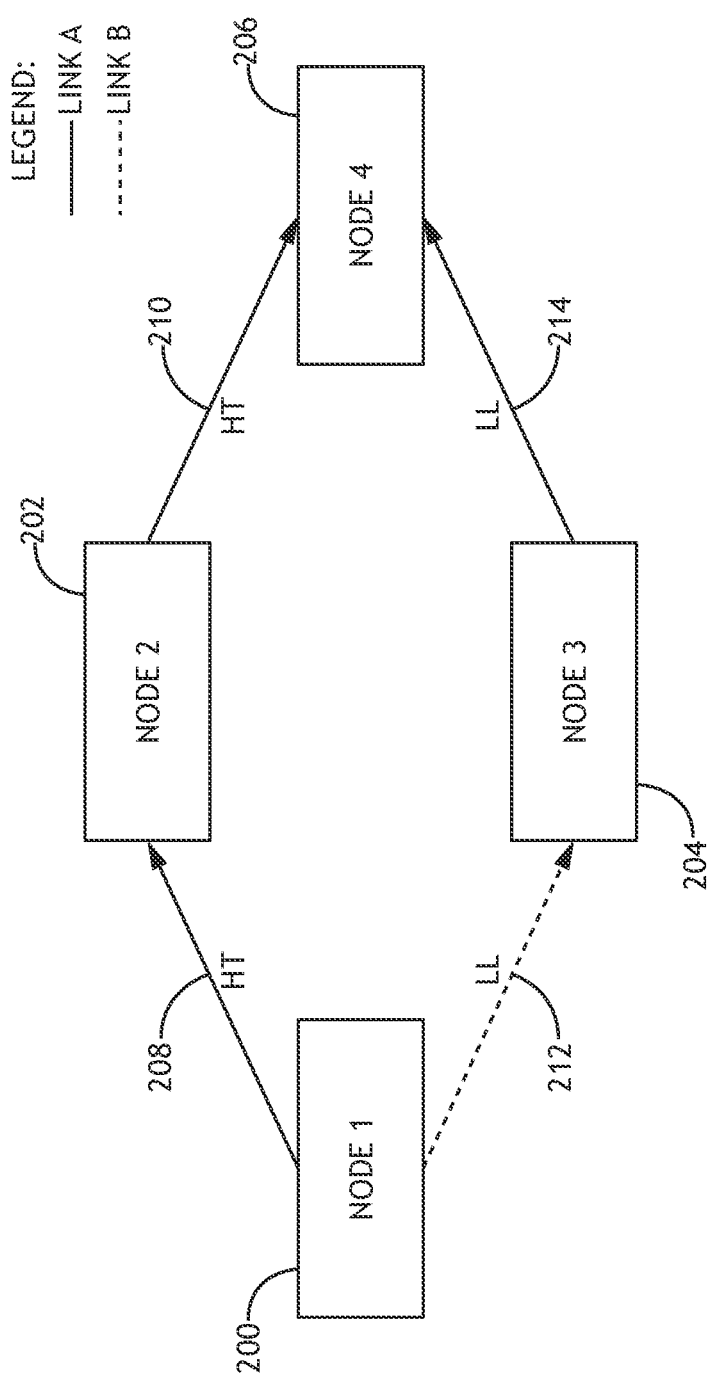
FIG. 2 shows a block diagram of a visualization according to an exemplary embodiment.

Referring to FIG. 2, a block diagram of a visualization according to an exemplary embodiment is shown. Where a user selects an initial node 200 and an end node 206, a system according to the present disclosure may receive or determine paths 208, 210, 212, 214 that enable traffic between the initial node 200 and the end node 206, including intervening nodes 202, 204. The system then characterizes paths 208, 210, 212, 214 according to datalink metrics that define traffic slices, and renders the paths 208, 210, 212, 214 in a way that indicates what slice contains the path 208, 210, 212, 214. In at least one embodiment, the system may also render a label for each path, corresponding to the slice or slices. Such labels allow for continued use of unique colors for identifying each unique heterogeneous link; offsets for labeling of lines may be included for ease of readability. In at least one embodiment, the user may select which slices to display.

In at least one embodiment, deselecting one or more nodes 200, 202, 204, 206 may clear the corresponding paths 208, 210, 212, 214.

Figure 3:
FIG. 3 shows a visualization according to an exemplary embodiment.

Referring to FIG. 3, a visualization according to an exemplary embodiment is shown. A system according to the present disclosure may receive or determine paths 308, 310, 312, 314 that enable traffic between an initial node 300 and an end node 306, including intervening nodes 302. The system then characterizes paths 308, 310, 312, 314 according to datalink metrics that define traffic slices, and renders the paths 308, 310, 312, 314 in a way that indicates what slice contains the path 308, 310, 312, 314. Nodes 316 that do not enable traffic between the initial node 300 and the end node 306 within the selected slices do not have any rendered paths, even though they could enable such traffic outside the selected slices.

Figure 4:
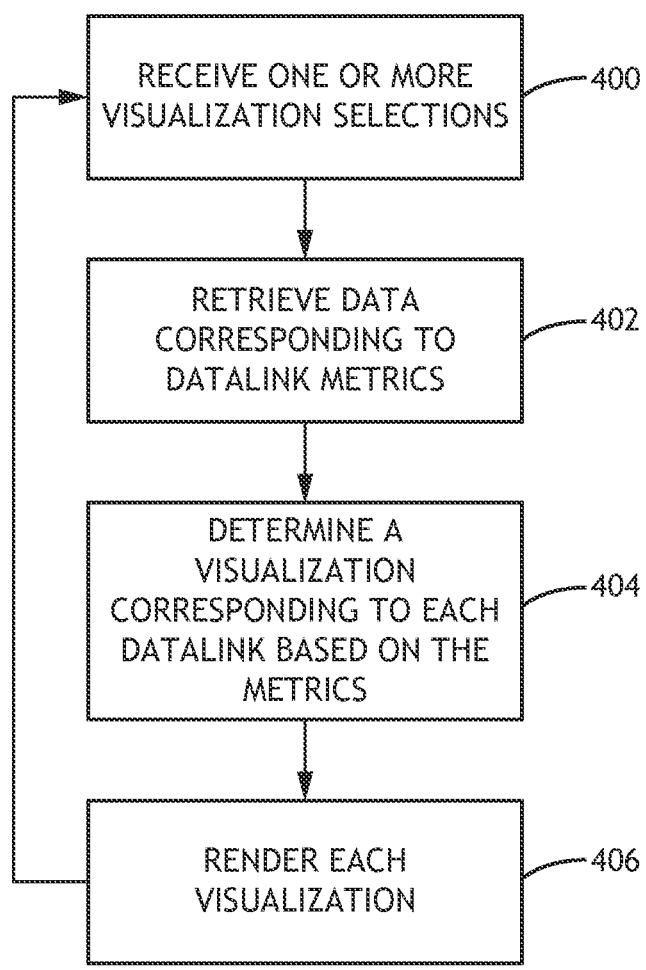
FIG. 4 shows a flowchart of a method according to an exemplary embodiment.

Referring to FIG. 4, a flowchart of a method according to an exemplary embodiment is shown. A visualization system receives 400 one or more visualization selections, including nodes of interest and slices of interest defined by datalink metrics. The system then retrieves 402 data corresponding to datalink metrics for paths connecting the selected nodes, and determines 404 a visualization corresponding to each path based on the datalink metrics. The system then renders 406 the paths according to the corresponding visualization, and continuously updates the rendered paths according to updated user selections and updated datalink metrics.

Embodiments of the present disclosure enable a network operator to select a source and destination address as well as a set of one or more traffic slices to display, and render only the corresponding paths in real time. A trace route through the network, per slice, from source to destination, is easily visualized without clutter. The selection of source and destination addresses, along with what slices to show can be modified on the fly to show the current view of the network. Embodiments enable the network operator to focus on traffic of interest to mission success while not displaying traffic paths not pertinent to the mission goals, and easily change focus on which traffic is currently of interest to the mission operator.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
a display; and
at least one processor in data communication with a memory storing processor executable code for configuring the at least one processor to:
receive one or more user slice selections corresponding to traffic slices;
receive an initial node and an end node selection;
identify one or more paths within the one or more slice selections that satisfy threshold metrics and enable datalink communication between the initial node and the end node;
determine a distinct visualization for each slice;
determine at least one path is within more than one slice selection; and
render the one or more paths according to the determined visualization, and at least one path according to a composite visualization to indicate the corresponding path is within more than one slice.

2. The computer apparatus of claim 1; wherein the at least one processor is further configured to render a label proximate to each of the one more paths, the label defined by the corresponding slice.

3. The computer apparatus of claim 1; wherein:
the at least one processor is further configured to receive at least an initial node selection and an end node selection; and
the one or more paths comprise paths enabling datalink connections between the initial node and the end node.

4. The computer apparatus of claim 1;
wherein the at least one processor is further configured to continuously receive updated datalink metrics and continuously re-render the one or more paths according to the updated datalink metrics in real-time.

5. The computer apparatus of claim 1;
wherein the at least one processor is further configured to determine one or more default slice selections based on at least one of a mission objective.

6. A method for visualizing datalink path slices comprising:
receiving at least an initial node selection and an end node selection;
receiving one or more user slice selections corresponding to traffic slices;
receiving an initial node and an end node selection;
identifying one or more paths within the one or more slice selections satisfying threshold metrics and enabling datalink connections between the initial node and the end node;
determining a distinct visualization for each slice;
determining at least one path is within more than one slice selection; and
rendering the one or more paths according to the determined visualization, and at least one path according to a composite visualization to indicate the corresponding path is within more than one slice.

7. The method of claim 6; further comprising rendering a label proximate to each of the one more paths, the label defined by the corresponding slice.

8. The method of claim 6; further comprising continuously receiving updated datalink metrics and continuously re-rendering the one or more paths according to the updated datalink metrics in real-time.

9. The method of claim 6; further comprising determining one or more default slice selections based on at least one of a mission objective.

* * * * *